US009542914B2

(12) United States Patent
Sakariya et al.

(10) Patent No.: US 9,542,914 B2
(45) Date of Patent: Jan. 10, 2017

(54) DISPLAY SYSTEM WITH IMPROVED GRAPHICS ABILITIES WHILE SWITCHING GRAPHICS PROCESSING UNITS

(75) Inventors: Kapil V. Sakariya, Sunnyvale, CA (US); Victor H. Yin, Cupertino, CA (US); Michael F. Culbert, Monte Sereno, CA (US)

(73) Assignee: Apple Inc., Cupertino, CA (US)

( * ) Notice: Subject to any disclaimer, the term of this patent is extended or adjusted under 35 U.S.C. 154(b) by 1316 days.

(21) Appl. No.: 12/347,413

(22) Filed: Dec. 31, 2008

(65) Prior Publication Data

US 2010/0164964 A1 Jul. 1, 2010

(51) Int. Cl.
*G06F 15/80* (2006.01)
*G09G 5/39* (2006.01)

(52) U.S. Cl.
CPC ............ *G09G 5/39* (2013.01); *G09G 2360/06* (2013.01); *G09G 2360/08* (2013.01)

(58) Field of Classification Search
USPC ................................................. 345/501–505
See application file for complete search history.

(56) References Cited

U.S. PATENT DOCUMENTS

| | | | | |
|---|---|---|---|---|
| 4,102,491 | A | 7/1978 | DeVito et al. | |
| 5,341,470 | A | 8/1994 | Simpson et al. | |
| 5,963,200 | A | 10/1999 | Deering et al. | |
| 6,385,208 | B1 | 5/2002 | Findlater et al. | |
| 6,535,208 | B1 | 3/2003 | Saltchev et al. | |
| 6,557,065 | B1 | 4/2003 | Peleg et al. | |
| 6,624,816 | B1 | 9/2003 | Jones, Jr. | |
| 6,624,817 | B1 * | 9/2003 | Langendorf | 345/520 |
| 6,738,068 | B2 | 5/2004 | Cohen et al. | |
| 6,738,856 | B1 | 5/2004 | Milley et al. | |
| 6,943,667 | B1 | 9/2005 | Kammer et al. | |
| 7,039,734 | B2 | 5/2006 | Sun et al. | |
| 7,039,739 | B2 | 5/2006 | Bonola | |
| 7,119,808 | B2 | 10/2006 | Gonzalez et al. | |
| 7,127,521 | B2 | 10/2006 | Hsu et al. | |
| 7,309,287 | B2 | 12/2007 | Miyamoto et al. | |
| 7,372,465 | B1 * | 5/2008 | Tamasi et al. | 345/502 |

(Continued)

FOREIGN PATENT DOCUMENTS

| | | |
|---|---|---|
| EP | 0272655 | 6/1988 |
| EP | 1158484 | 11/2001 |

(Continued)

OTHER PUBLICATIONS

Author Unknown, "Serial-MII Specification," Cisco Systems, Inc., Revision 2.1, pp. 1-7, Feb. 9, 2000.

(Continued)

*Primary Examiner* — Peter Hoang

(74) *Attorney, Agent, or Firm* — Meyertons, Hood, Kivlin, Kowert & Goetzel, P.C.

(57) ABSTRACT

Methods and apparatuses are disclosed for improving graphics abilities while switching between graphics processing units (GPUs). Some embodiments may include a display system, including a plurality of graphics processing units (GPUs) and a memory buffer coupled to the GPUs via a timing controller, where the memory buffer stores data associated with a first video frame from a first GPU within the plurality of GPUs and where the timing controller is switching between the first GPU and a second GPU within the plurality.

16 Claims, 3 Drawing Sheets

(56) References Cited

U.S. PATENT DOCUMENTS

| | | | | |
|---|---|---|---|---|
| 7,382,333 | B2 | 6/2008 | Chen et al. | |
| 7,506,188 | B2 | 3/2009 | Krantz et al. | |
| 7,849,246 | B2 | 12/2010 | Konishi et al. | |
| 7,865,744 | B2 | 1/2011 | Lee et al. | |
| 7,882,282 | B2 | 2/2011 | Haban et al. | |
| 7,898,994 | B2 | 3/2011 | Zhao et al. | |
| 2003/0226050 | A1 | 12/2003 | Yik et al. | |
| 2005/0030306 | A1 | 2/2005 | Lan et al. | |
| 2005/0099431 | A1 | 5/2005 | Herbert et al. | |
| 2005/0231498 | A1 | 10/2005 | Abe et al. | |
| 2006/0017847 | A1 | 1/2006 | Tardif | |
| 2007/0283175 | A1 | 12/2007 | Marinkovic et al. | |
| 2007/0285428 | A1* | 12/2007 | Foster et al. | 345/503 |
| 2008/0030509 | A1 | 2/2008 | Conroy et al. | |
| 2008/0117217 | A1* | 5/2008 | Bakalash et al. | 345/502 |
| 2008/0168285 | A1 | 7/2008 | de Cesare et al. | |
| 2009/0153528 | A1 | 6/2009 | Orr | |
| 2010/0083023 | A1 | 4/2010 | Bjegovic et al. | |
| 2010/0083026 | A1 | 4/2010 | Millet et al. | |
| 2010/0091039 | A1 | 4/2010 | Marcu et al. | |
| 2010/0103147 | A1 | 4/2010 | Sumpter | |
| 2010/0164962 | A1 | 7/2010 | Sakariya et al. | |
| 2010/0164963 | A1 | 7/2010 | Sakariya | |
| 2010/0164966 | A1 | 7/2010 | Sakariya | |
| 2011/0032275 | A1 | 2/2011 | Marcu et al. | |

FOREIGN PATENT DOCUMENTS

| | | |
|---|---|---|
| EP | 1962265 | 8/2008 |
| JP | 06006733 | 1/1994 |
| WO | WO 2005059880 | 6/2005 |
| WO | 2008016424 | 2/2008 |

OTHER PUBLICATIONS

International Search Report, PCT Application No. PCT/US2009/069851, 6 pages, Aug. 9, 2010.

* cited by examiner

DISPLAY SYSTEM WITH IMPROVED GRAPHICS ABILITIES WHILE SWITCHING GRAPHICS PROCESSING UNITS

RELATED APPLICATIONS

This application is related to, and incorporates by reference, the following applications: U.S. patent application Ser. No. 12/347,312, "Timing Controller Capable of Switching Between Graphics Processing Units," filed Dec. 31, 2008, now U.S. Pat. No. 8,508,538, issued Aug. 13, 2013; U.S. patent application Ser. No. 12/347,364, "Improved Switch for Graphics Processing Units," filed Dec. 31, 2008, now U.S. Pat. No. 8,207,974, issued Jun. 26, 2012; and U.S. patent application Ser. No. 12/347,491, "Improved Timing Controller for Graphics System," filed Dec. 31, 2008.

TECHNICAL FIELD

The present invention relates generally to graphics processing units (GPUs) of electronic devices, and more particularly to switching between multiple GPUs during operation of the electronic devices.

BACKGROUND

Electronic devices are ubiquitous in society and can be found in everything from wristwatches to computers. The complexity and sophistication of these electronic devices usually increase with each generation, and as a result, newer electronic devices often include greater graphics capabilities their predecessors. For example, electronic devices may include multiple GPUs instead of a single GPU, where each of the multiple GPUs may have different graphics capabilities. In this manner, graphics operations may be shared between these multiple GPUs.

Often in a multiple GPU environment, it may become necessary to swap control of a display device among the multiple GPUs for various reasons. For example, the GPUs that have greater graphics capabilities may consume greater power than the GPUs that have lesser graphics capabilities. Additionally, since newer generations of electronic devices are more portable, they often have limited battery lives. Thus, in order to prolong battery life, it is often desirable to swap between the high-power GPUs and the lower-power GPUs during operation in an attempt to strike a balance between complex graphics abilities and saving power.

Regardless of the motivation for swapping GPUs, swapping GPUs during operation may cause defects in the image quality, such as image glitches. This may be especially true when switching between an internal GPU and an external GPU. Accordingly, methods and apparatuses that more efficiently switch between GPUs without introducing visual artifacts are needed.

SUMMARY

Methods and apparatuses are disclosed for improving graphics abilities while switching between graphics processing units (GPUs). Some embodiments may include a display system, including a plurality of graphics processing units (GPUs) and a memory buffer coupled to the GPUs via a timing controller, where the memory buffer stores data associated with a first video frame from a first GPU within the plurality of GPUs and where the timing controller is switching between the first GPU and a second GPU within the plurality.

Other embodiments may include a method of switching between GPUs during operation of a display system, the method may include indicating an upcoming GPU switch from a first GPU within a plurality of GPUs to a second GPU within a plurality of GPUs, storing a first video frame from the first GPU in a memory buffer, switching between the first GPU and the second GPU, and refreshing a display from the memory buffer during the switching from the first GPU to the second GPU.

Still other embodiments may include a tangible computer readable medium including computer readable instructions, said instructions including a plurality of instructions capable of being implemented while switching between at least two GPUs in a plurality of GPUs, said instructions including displaying data from a current GPU in the plurality of GPUs, indicating an upcoming GPU switch, storing a future data frame, switching between the current GPU and a new GPU in the plurality, and refreshing a display from a memory buffer while switching between the current GPU and the new GPU.

BRIEF DESCRIPTION OF THE DRAWINGS

The use of the same reference numerals in different drawings indicates similar or identical items.

DETAILED DESCRIPTION OF THE INVENTION

The following discussion describes various embodiments of a display system that may minimize visual artifacts, such as glitches, which may be present when switching from a current GPU to a new GPU. Some embodiments may implement a memory buffer in the display system that retains one or more portions of a video frame from the current GPU prior to the GPU switch. By refreshing the display system with the contents of this memory buffer during the switch the user may continue to see the same image as before the switch instead of glitches.

Although one or more of these embodiments may be described in detail, the embodiments disclosed should not be interpreted or otherwise used as limiting the scope of the disclosure, including the claims. In addition, one skilled in the art will understand that the following description has broad application. Accordingly, the discussion of any embodiment is meant only to be exemplary and is not intended to intimate that the scope of the disclosure, including the claims, is limited to these embodiments.

Figure 1:
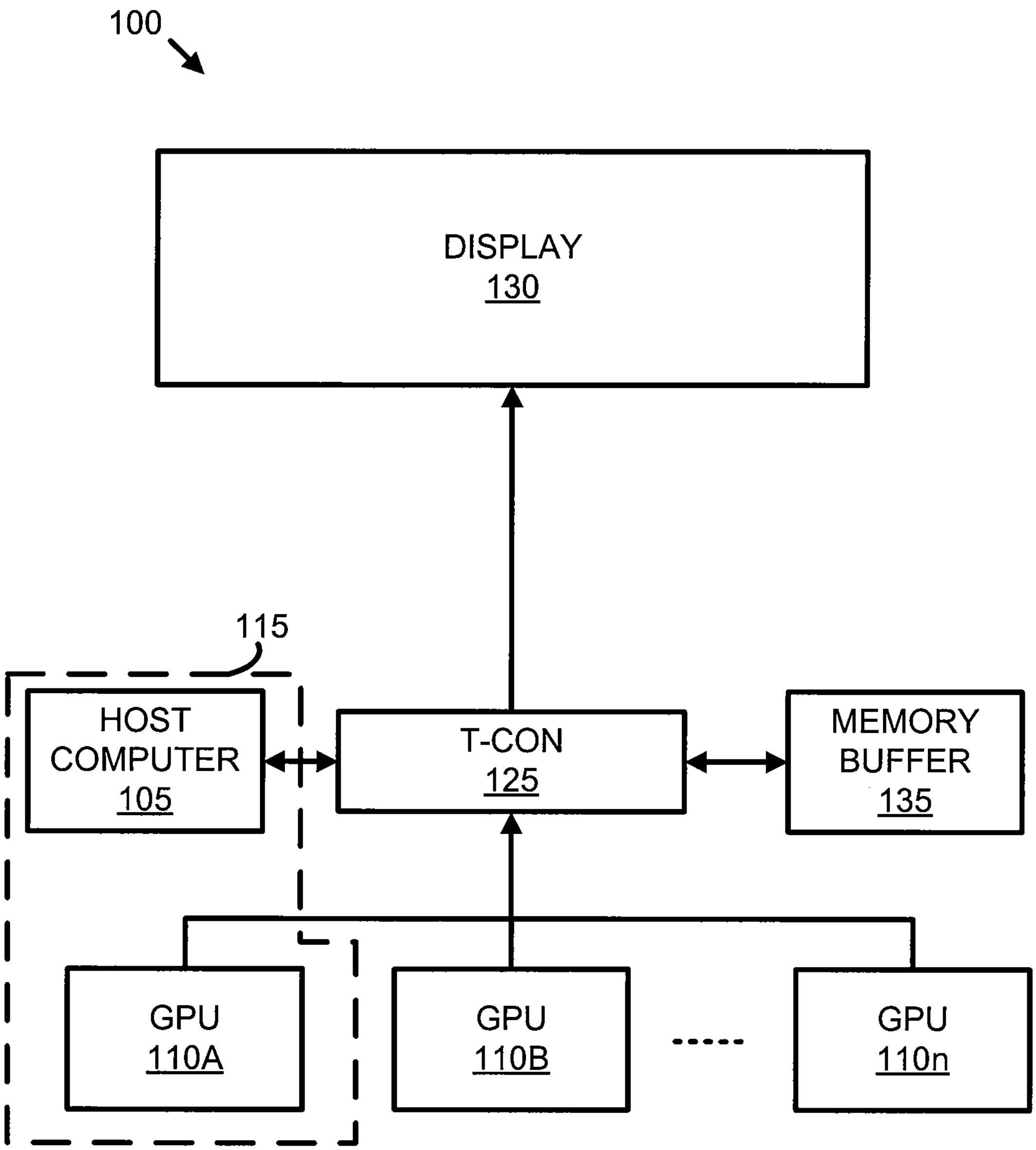
FIG. 1 illustrates an exemplary display system.

FIG. 1 illustrates an exemplary display system 100 that may be implemented in one embodiment. Prior to delving into the specifics of FIG. 1, it should be noted that the components listed in FIG. 1, and referred to below, are merely examples of one possible implementation. Other components, buses, and/or protocols may be used in other implementations without departing from the spirit and scope of the detailed description. Also, although one or more components of the display system 100 are represented using separate blocks, it should be appreciated that one or more of the components of the display system 100 may be part of the same integrated circuit.

Referring now to FIG. 1, the display system 100 may include a host computer system 105. In some embodiments, the host computer 105 may be a laptop computer operating on battery power. In other embodiments, the host computer 105 may be a desktop computer, enterprise server, or networked computer device that operates off of wall power. During operation, the host computer 105 may communicate control signals and other communication signal to various devices within the system.

The display system also may include multiple GPUs 110A-110*n*. These GPUs 110A-110*n* may exist within the computer system 100 in a variety of forms and configurations. In some embodiments, the GPU 110A may be implemented as part of another component within the system 100. For example, the GPU 110A may be part of a chipset in the host computer 105 (as indicated by the dashed line 115) while the other GPUs 110B-110*n* may be external to the chipset. The chipset may include any variety of integrated circuits, such as a set of integrated circuits responsible for establishing a communication link between the GPUs 110-A-110*n* and the host computer 105, such a Northbridge chipset.

A timing controller (T-CON) 125 may be coupled to both the host computer 105 and the GPUs 110A-110*n*. During operation, the T-CON 125 may manage switching between the GPUs 110A-110*n* such that visual artifacts are minimized. The T-CON 125 may receive video image and frame data from various components in the system. As the T-CON 125 receives these signals, it may process them and send them out in a format that is compatible with a display 130 coupled to the T-CON 125. The display 130 may be any variety including liquid crystal displays (LCDs), plasma displays, cathode ray tubes (CRTs) or the like. Likewise, the format of the video data communicated from the T-CON 125 to the display 130 may include a wide variety of formats, such as display port (DP), low voltage differential signaling (LVDS), etc.

During operation of the video system 100, the GPUs 110A-110*n* may generate video image data along with frame and line synchronization signals. For example, the frame synchronization signals may include a vertical blanking interval (VBI) in between successive frames of video data. Further, the line synchronization signals may include a horizontal blanking interval (HBI) in between successive lines of video data. Data generated by the GPUs 110A-110*n* may be communicated to the T-CON 125.

When the T-CON 125 receives these signals, it may process them and send them out in a format that is compatible with a display 130 coupled to the T-CON 125, such as DP, LVDS, etc. In addition to sending these signals to the display 130 the T-CON 125 also may send these signals to a memory buffer 135. The precise configuration of the memory buffer 135 may vary between embodiments. For example, in some embodiments, the memory buffer 135 may be sized such that it is capable of storing a complete frame of video data. In other embodiments, the memory buffer 135 may be sized such that it is capable of storing partial video frames. In still other embodiments, the memory buffer 135 may be sized such that it is capable of storing multiple complete video frames.

Although FIG. 1 illustrates the memory buffer 135 coupled to the T-CON 125 such that signals may be written to the memory buffer 135 and the display 130 in parallel, other embodiments are possible where the memory buffer 135 may be coupled between the T-CON 125 and the display 130. Furthermore, the format of data stored in the memory buffer 135 may vary. For example, in some embodiments, the data may be stored in the memory buffer 135 in red-green-blue (RGB) format at varying resolutions so that the data may be directly painted to the display 130. In other embodiments, the video data may be stored in the memory buffer 135 in a format such that the T-CON 125 decodes the stored data prior to painting it.

Referring still to FIG. 1, the GPUs 110A-110*n* may have different operational capabilities. For example, as mentioned above, the GPU 110A may be integrated within another device in the display system 100, such as a chipset in the host computer 105, and as such, the GPU 110A may not be as graphically capable as the GPU 110B, which may be a stand alone discrete integrated circuit. In addition to having different operational capabilities, the GPUs 110A-110*n* may consume different amounts of power. Because of this, it may be necessary to balance the desire to use the GPU 110B (i.e., have more graphical capabilities) with the desire to use the GPU 110A (i.e., consume less power) by switching among the GPUs 110A-110*n*.

In conventional approaches to switching between these GPUs, there may be periods of time when the link providing video data is lost. For example, if the GPU 110A is currently providing video data, and a GPU switch occurs, there may be a period during the switch where there is no video available to be painted on the display 130. In some embodiments, however, the memory buffer may be used to refresh the display 130.

Figure 2:
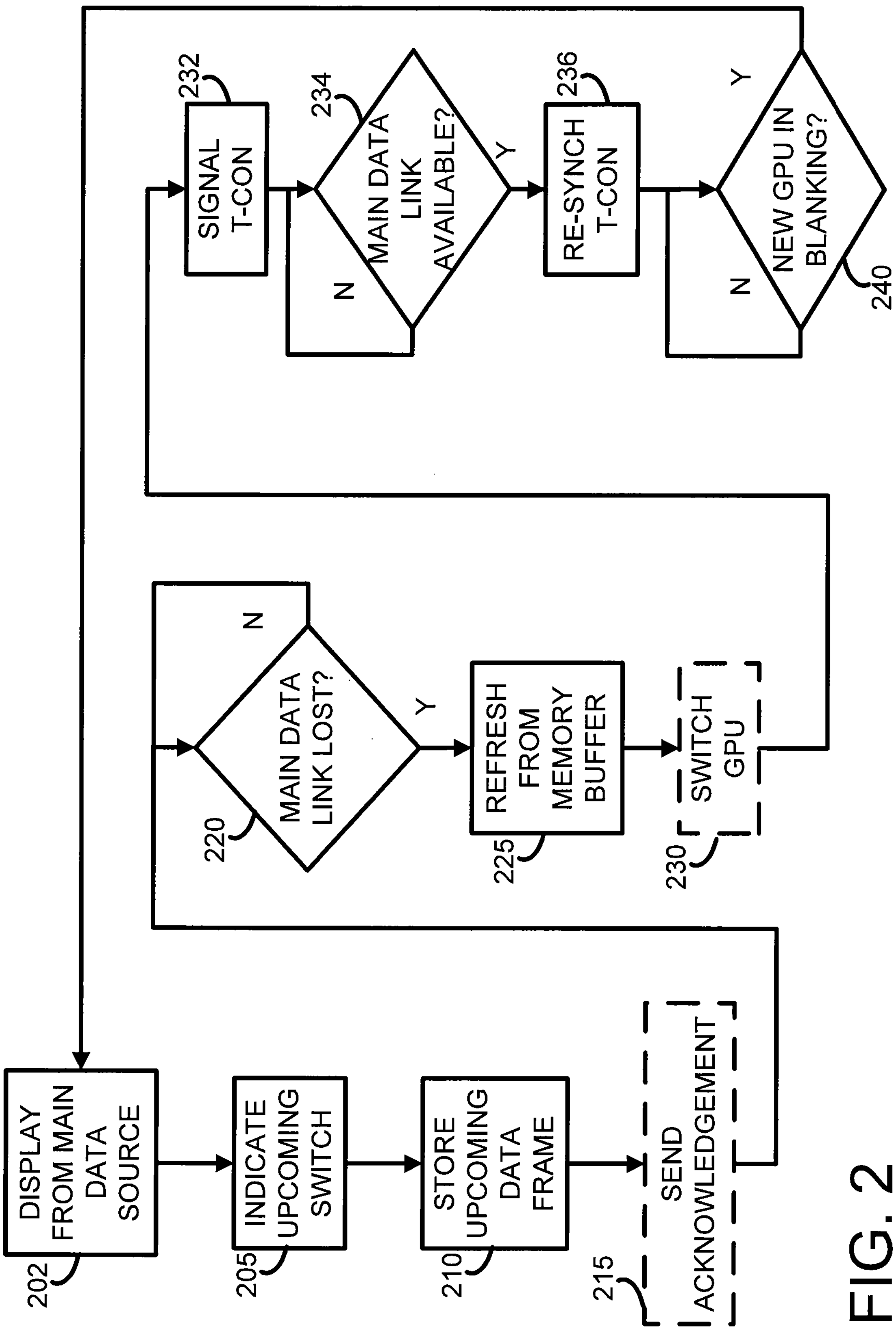
FIG. 2 illustrates exemplary operations that may be performed by the display system.

FIG. 2 illustrates exemplary operations that may be performed by the display system 100 to minimize screen glitches and/or visual artifacts during a GPU switch. During normal operations, the T-CON 125 may obtain video display data from the main video data source, such as the GPU 110A. This is shown in block 202.

In block 205, one or more components within the system 100 may indicate that a GPU switch is about to occur. This may occur as a result of power and/or graphic performance considerations. For example, the host computer 105 may determine that too much power is being consumed and that a GPU switch may be in order. Alternatively, the host computer 105 may determine that greater graphics capabilities are needed and indicate an upcoming switch per block 205.

The precise timing of when the indication per block 205 occurs may vary between embodiments. That is, in some embodiments, the indication in block 205 may occur a predetermined number of frames prior to actually switching between the GPUs 110A-110*n* to allow one or more components within the system 100 enough time to prepare for a switch. In other embodiments, the indication per block 205 may occur just prior to the GPU switch.

Subsequent to the indication in block 205, one or more frames may be stored in the memory buffer 135 per block 210. As mentioned previously, the number of frames stored during block 210 may vary. For example, in some embodiments, a single complete data frame may be stored in the memory buffer 135 and this data frame may be painted to the display 130 during the GPU switch. In other embodiments, a series of data frames may be stored in the memory buffer 135 and one or more of this series of data frames may be painted to the display 130 during the GPU switch. In still other embodiments, multiple data frames may be stored in the memory buffer 135 and the last frame of data may be painted to the display 130 during the GPU switch.

Thus, if the video data coming from the GPUs 110A-110*n* is lost during the GPU switch, then the image to the display 130 may be substantially unchanged. In other words, by implementing the memory buffer 135, the visual artifacts that may be present in a conventional GPU switch may be minimized and/or avoided.

Although some embodiments may include the memory buffer 135 storing upcoming frames (per block 210) as a result of the host computer 105 indicating a switch is about to occur (per block 205), other embodiments may store each data frame regardless of whether a GPU switch is about to occur.

In some embodiments, the memory buffer 135 may only store video data when a switch is about to occur. Referring briefly to the configuration shown in FIG. 1, the T-CON 125 may be connected to the memory buffer 135 and the display 130 in parallel. As a result, the memory buffer 135 shown in FIG. 1 may be written to in parallel with the display 130. In this manner, the memory buffer 135 shown in FIG. 1 may be powered down until a switch is about to occur, and therefore, the overall power consumed by the display system 100 may be reduced.

Referring again to FIG. 2, one or more components within the display system 100 may receive an acknowledgement as to when to begin using the stored data. This is shown in block 215. For example, in some embodiments, once the memory buffer 135 has completed storing the requested video data, it may optionally send an acknowledgement to the T-CON 125. In other embodiments, the current GPU may send an acknowledgement to the T-CON 125 when it has completed storing data to the memory buffer 135. In the embodiments where multiple data frames (in either complete or partial form) are stored, the acknowledgement of block 215 may be a batch acknowledgement.

After the acknowledgement of block 215 is received, the system 100 may wait for the main data link to actually be lost. As mentioned previously, the time between the indication of an upcoming switch (block 205) and losing the main data link may be indeterminate. Thus, control in block 220 may loop back upon itself for this indeterminate time until the main data link is actually lost.

The actual triggering of the loss of the data link may vary between embodiments. In some embodiments, the loss may be triggered when the T-CON 125 fails to receive video data signals from the current GPU. Other embodiments may include one or more components sending a link-lost signal a predetermined number of frames after the indication in block 205. Regardless of the method of triggering the loss of the data link, once the link is lost, the contents of the memory buffer 135 may be used to refresh the display 130 during periods of loss. This is shown in block 225.

This refresh may occur as a result of the T-CON 125 continually reading the video frame data stored in the memory buffer 135 and painting the display 130 with the same. For example, the video frame data in the memory buffer 135 shown in FIG. 1 may be stored in an encoded format, to conserve memory space, the T-CON 125 may decode this stored data and paint the display 130 with the same. In some embodiments, there may be a plurality of data frames stored in the memory buffer 135, and as a result, the refresh from the memory buffer 135 may be a refresh of the last frame of data from the memory buffer 135.

Referring again to FIG. 2, with the display 130 being refreshed from the memory buffer 135, the T-CON 125 may perform a GPU switch (per block 230) without introducing screen glitches into the images painted on the display 130. In some embodiments, the T-CON 125 may include switching circuitry, such that multiple GPUs may be powered on concurrently. In other embodiments, the GPUs **110A-110*n* may be wired to the T-CON 125** via wired-OR connections and only one GPU may be able to be active at a time.

In still other embodiments, the GPU switch of block 230 may be optional as shown by the dashed lines. That is, the system 100 may reevaluate whether the conditions that provoked the need for a GPU switch (e.g., power consumption or increased graphics need) still exist and may forgo switching in block 230.

In block 232, the display system 100 may signal the T-CON 125 that the main data link is about to be available again. As a result, the T-CON 125 may await its availability in block 234. If the main data link is not available, control may flow back to block 234 so that the T-CON 125 may continue to monitor the main data link's availability. On the other hand, if the main data link does become available, then control may flow to the block 236, where the T-CON 125 is re-synchronized with the video data signal from the new GPU. This may include recovering a clock signal from within the video data signal.

Once the T-CON 125 is synchronized, control may flow to block 240 where the new GPU may be checked to see if it is undergoing a blanking period. In the event that the new GPU is undergoing a blanking period, then the normal display operations may resume (per block 202) from the new GPU at the conclusion of the blanking period.

Figure 3:
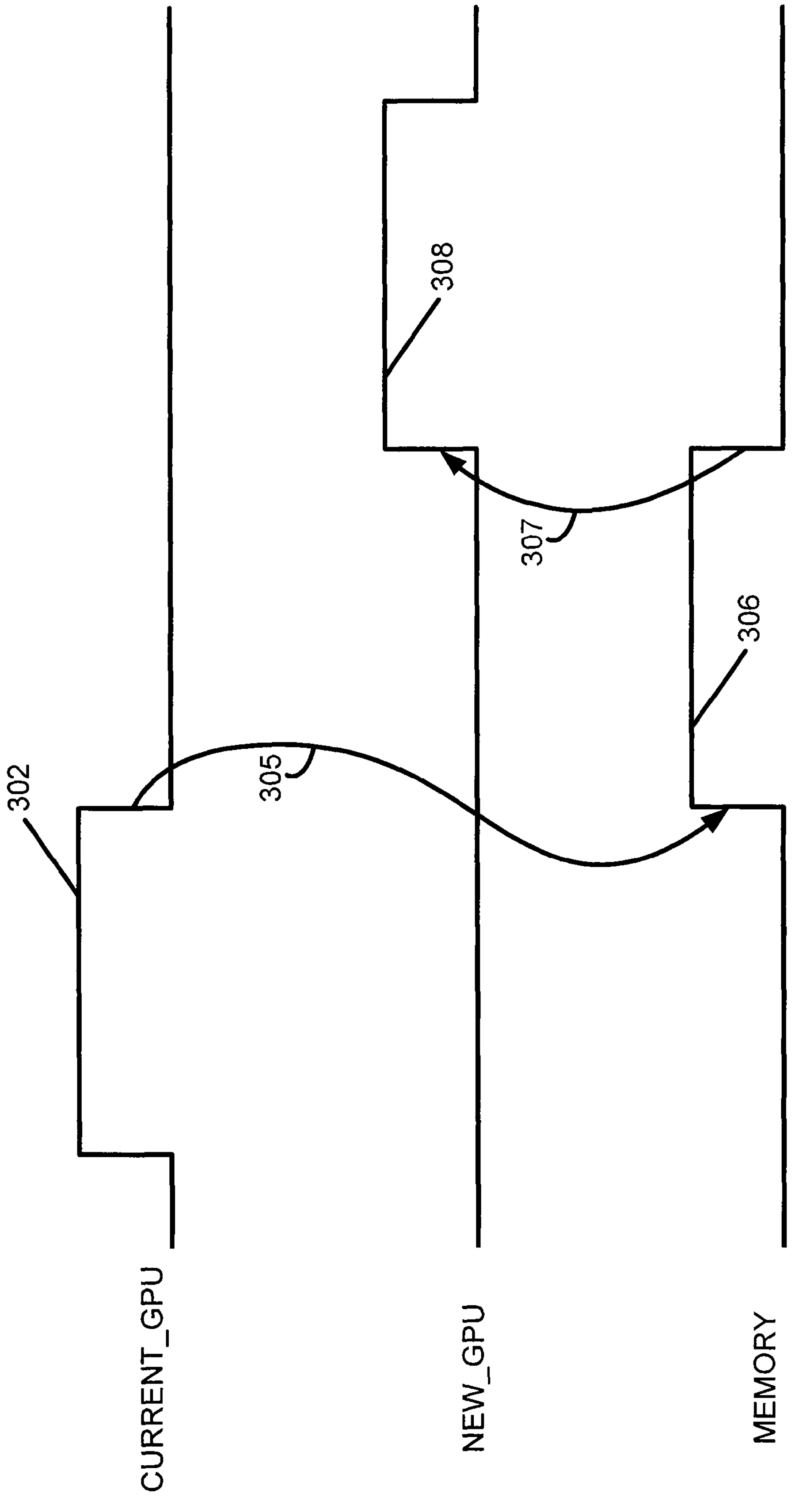
FIG. 3 illustrates exemplary timing diagrams resulting from displaying video data from a memory buffer during a GPU switch.

FIG. 3 illustrates exemplary timing diagrams resulting from displaying video data from a memory buffer during a GPU switch. Referring to FIG. 3 in conjunction with FIG. 2, during a period 302, video data may be displayed from the current GPU as the main data source (per block 202). As shown by the arrow 305, the current GPU may indicate that it is about to undergo a GPU switch (per block 205), store an upcoming frame in the memory buffer 135 (per block 210), and begin refreshing from the memory buffer 135 (per block 225). Thus, during a period 306, video data may be displayed from the memory buffer 135. The length of the period 306 may last until the new GPU enters a blanking period (per block 240). Thereafter, display may commence from the new GPU as shown by the arrow 307 and a display period 308, which may correspond to displaying from the main data source per block 202.

What is claimed is:

1. A system, comprising:
- a display;
- a plurality of graphics processing units (GPUs);
- a memory buffer; and
- a timing controller configured to:
  - receive first video data from a first GPU of the plurality of GPUs, wherein the first video data includes a first plurality of frames;
  - send one or more frames of the first plurality of frames to the display; and
  - store at least one frame of the first plurality of frames in the memory buffer in response to receiving an indication that a switch from the first GPU to a second GPU of the plurality of GPUs is to occur;
- wherein the memory buffer is configured to send an acknowledgement signal to the timing controller in response to a determination that storage of the at least one frame of data has completed;
- wherein the timing controller is further configured to:
  - send, to the display, the at least one frame from the memory buffer in response to a determination that the first video data is no longer being received from the first GPU and the acknowledgement signal has been received; and receive second video data from the second GPU of the plurality of GPUs in response to sending, to the display, the at least one frame from the memory buffer.

2. The system of claim 1, wherein the second video data is to be provided to the display subsequent to the at least one frame from the memory buffer.

3. The system of claim 1, wherein the timing controller is further configured to store a predetermined number frames of the first plurality of frames to the memory buffer periodically in response to a determination that the predefined number of frames has been received.

4. The system of claim 1, wherein to store the at least one frame, the timing controller is further configured to store, for each frame sent to the display, a respective frame to the memory buffer.

5. The system of claim 1, wherein the timing controller is further configured to store the at least one frame in the memory buffer concurrently with sending the at least one frame to the display.

6. The system of claim 5, wherein the memory buffer is powered off while the timing controller is powered on.

7. The system of claim 1, wherein the second GPU is external to a chipset.

8. A method comprising:

receiving first video data from a first graphics processing unit (GPU) of a plurality of GPUs, wherein the first video data includes a first plurality of frames;

storing, in a memory buffer, one or more frames of the first plurality of frames in response to receiving an indication that a switch from the first GPU to a second GPU of the plurality of GPUs is to occur;

sending, by the memory buffer, an acknowledgement signal in response to determining that storage of the at least one frame of data has completed;

sending, to a display, at least one frame from the memory buffer in response to determining that the first video data is no longer being received from the first GPU and the acknowledgement signal has been received; and receiving second video data from the second GPU of the plurality of GPUs in response to sending, to the display, the at least one frame from the memory buffer, wherein the second video data includes a second plurality of frames.

9. The method of claim 8, further comprising receiving the second video data from the second GPU after a time period has elapsed since receiving the first video data.

10. The method of claim 9, further comprising sending, to the display, one or more frames of the second plurality of frames in response to a determination that the at least one frame from the memory buffer has been sent to the display.

11. The method of claim 8, further comprising powering down the memory buffer prior to receiving the first video frame data.

12. The method of claim 8, wherein storing the one or more frames in the memory buffer comprises storing, in the memory buffer, an additional one or more frames of the first plurality of frames, wherein the additional one or more frames are to be subsequently displayed.

13. A non-transitory computer readable medium comprising computer readable instructions that, when executed by a computer processor, cause the computer processor to:

receive first video data from a first graphics processing unit (GPU) in a plurality of GPUs, wherein the first video data includes a first plurality of frames;

store, in a memory buffer, one or more frames of the first plurality of frames in response to receiving an indication that a switch from the first GPU to a second GPU of the plurality of GPUs is to occur;

send, by the memory buffer, an acknowledgement signal in response to determining that storage of the at least one frame of data has completed;

send, to a display, at least one frame from the memory buffer in response to determining that the first video data is no longer being received from the first GPU and the acknowledgement signal has been received; and receive second video data from the second GPU of the plurality of GPUs in response to sending, to the display, that at least one frame from the memory buffer.

14. The non-transitory computer readable medium of claim 13, further comprising computer readable instructions that, when executed by the computer processor, cause the computer processor to determine whether the second GPU is experiencing a blanking period.

15. The non-transitory computer readable medium of claim 14, wherein in the event that the second GPU concludes experiencing a blanking period, displaying data from the second GPU.

16. The non-transitory computer readable medium of claim 15, wherein the instructions that cause the computer processor to send at least one frame to the display from the memory buffer includes instructions that cause the computer processor to remove visual artifacts caused by the switching between the first GPU and the second GPU.

* * * * *